United States Patent [19]

Krist et al.

[11] Patent Number: 4,756,806
[45] Date of Patent: Jul. 12, 1988

[54] HYBRID THERMOELECTROCHEMICAL SYNTHESIS OF GASEOUS FUELS FROM WATER AND CARBON DIOXIDE

[75] Inventors: Francis K. Krist; Robert V. Serauskas, both of Lincolnshire, Ill.

[73] Assignee: Gas Research Institute, Chicago, Ill.

[21] Appl. No.: 64,997

[22] Filed: Jun. 18, 1987

[51] Int. Cl.[4] .................................................. C25C 1/00
[52] U.S. Cl. .............................. 204/59 R; 48/196 FM
[58] Field of Search ............... 48/196; 204/59 R, 129

[56] References Cited

U.S. PATENT DOCUMENTS

| | | | |
|---|---|---|---|
| 1,734,559 | 11/1929 | Casale | 48/196 |
| 2,199,475 | 5/1940 | Wilcox | 23/212 |
| 2,256,333 | 9/1941 | Wilcox et al. | 252/373 |
| 2,266,989 | 12/1941 | Radtke | 48/75 |
| 2,526,521 | 10/1950 | Voorhies, Jr. | 48/196 |
| 2,529,630 | 11/1950 | Reichl | 48/215 |
| 2,607,670 | 8/1952 | Lewis, Jr. | 48/196 |
| 2,665,199 | 1/1954 | Martin et al. | 48/196 |
| 2,743,171 | 4/1956 | Janeway, Jr. | 48/196 |
| 2,859,103 | 11/1958 | Greco | 48/196 |
| 2,942,958 | 6/1960 | Dwyer | 48/196 |
| 3,090,682 | 5/1963 | Bartholome et al. | 48/196 |
| 3,132,010 | 5/1964 | Dwyer et al. | 48/196 |
| 3,766,027 | 10/1973 | Gregory | 204/72 |
| 3,852,180 | 12/1974 | Gregory | 204/72 |
| 4,182,746 | 1/1980 | Myint | 423/415 A |
| 4,332,650 | 6/1982 | Foh et al. | 204/104 |
| 4,404,068 | 9/1983 | Huggins et al. | 204/59 R |
| 4,673,473 | 6/1987 | Ang et al. | 204/59 R |

OTHER PUBLICATIONS

Fraenkel, D., Levitan, R. and Levy, M., "A Solar Thermochemical Pipe Based on the $CO_2$—$CH_4$ (1:1) System", Int. J. Hydrogen Energy, II, 267, 1986.

Gur, T. M. and Huggins, R. A., "Methane Synthesis on Nickel by a Solid-State Ionic Method", Science, 219, 967, Feb. 25, 1983.

Gur, T. M. and Huggins, R. A., "Electrocatalysis of the Carbon Monoxide Methanation Reaction on Stabilized Zirconiz", Proc. of the Symp. on Electrocatalysis, Electrochem. Soc., Pennington, N.J., 1982.

Biallas, B., Behr, F., Hunsanger, K. Kugler, B., Weirich, W., "The Methane-Methanol Hybrid Cycle", Hydrogen Energy Progress IV, Proceeding of the 4th World Hydrogen Energy Conference, California, U.S.A., edited by T. N. Veziroglu, W. D. VanVorst, J. H. Kelly, 1982.

*Primary Examiner*—R. L. Andrews
*Attorney, Agent, or Firm*—Thomas W. Speckman; Ann W. Speckman

[57] ABSTRACT

A hybrid thermoelectrochemical process cycle for production of gaseous fuels from cycle inputs of water and carbon dioxide combines thermochemical methane reforming and electrochemical carbon monoxide reduction providing a cycle which may be driven by energy from solar or nuclear sources.

21 Claims, 1 Drawing Sheet

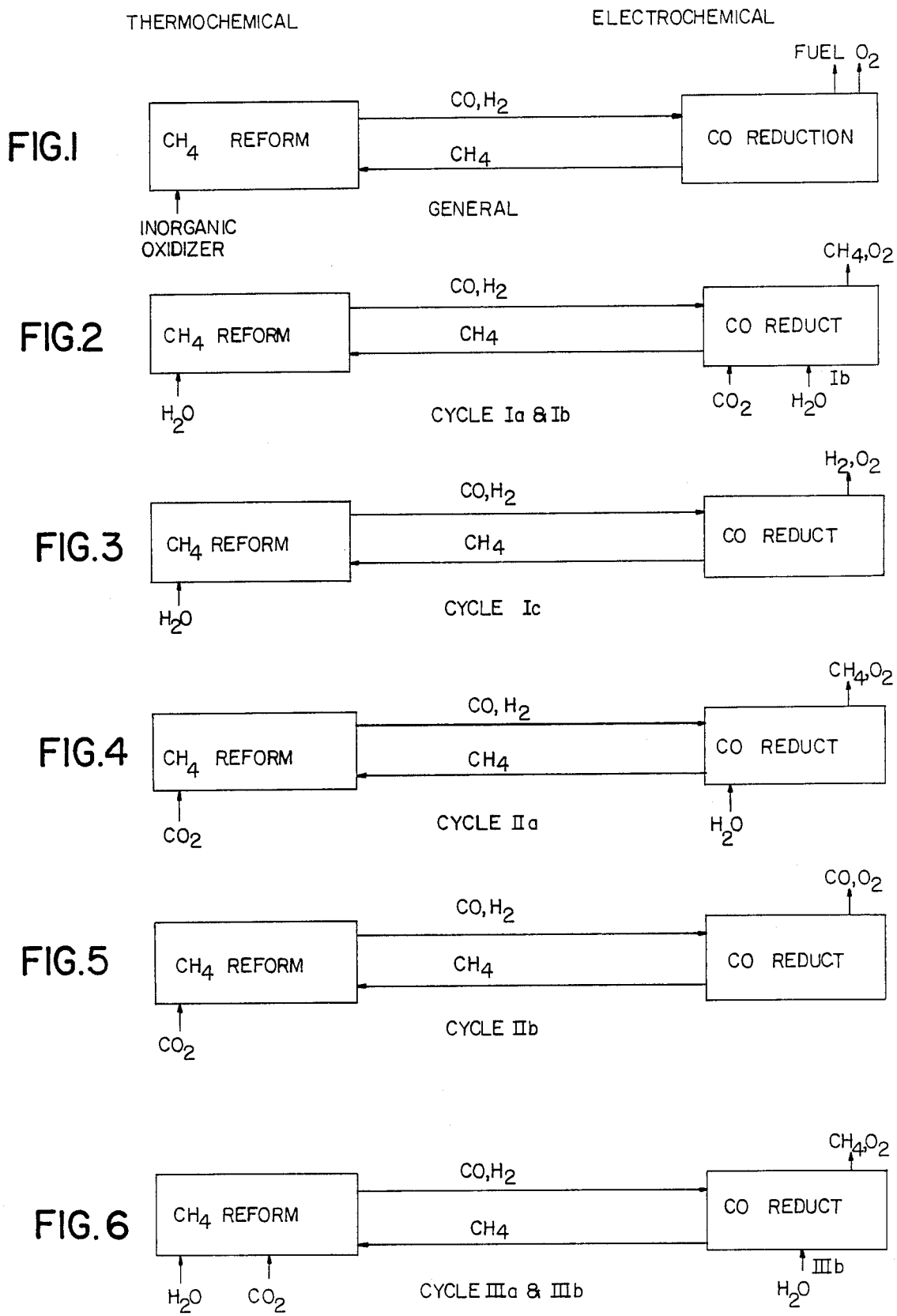

HYBRID THERMOELECTROCHEMICAL SYNTHESIS OF GASEOUS FUELS FROM WATER AND CARBON DIOXIDE

BACKGROUND OF THE INVENTION

1. Field of the Invention

This invention relates to a hybrid thermoelectrochemical process for production of gaseous fuels from water and carbon dioxide. The process provides a simple hybrid thermoelectrochemical reaction couple of the thermochemical reaction of reforming methane using carbon dioxide or steam and the electrochemical reaction is reduction of the reforming product producing a net gaseous fuel and oxygen for withdrawal from the cycle and methane for recycle. The reforming step can be driven by solar or nuclear thermal energy while the electrochemical energy can be supplied by a solar photovoltaic or nuclear driven generator.

2. Description of the Prior Art

Gaseous fuels which have methane as a principal component are presently derived from natural gas supplies which, as a natural resource, are finite. Methane-rich fuels can also be derived from coal or other natural carbonaceous sources which are also generally finite. It would be advantageous to provide new sources of methane-rich gaseous fuels based upon renewable or sustainable energy sources. It would be especially advantageous to use inorganic feeds such as water and carbon dioxide to produce methane-containing fuels.

Steam reforming of methane is a known reaction practiced in a number of processes as exemplified by U.S. Pat. Nos. 1,734,559, 2,256,333, 2,665,199, 2,743,171, 2,942,958, 3,090,682, 3,132,010, 2,199,475, 2,266,989, 2,526,521, 2,529,630, 2,607,670, 2,859,103 and 4,182,746. Carbon dioxide reforming of methane is not a commercial process, but is being investigated in several laboratories. Fraenkel, D., Levitan, R. and Levy, M., "A Solar Thermochemical Pipe Based on the $CO_2$—$CH_4$ (1:1) System", Int. J. Hydrogen Energy, 11, 267, 1986 teaches a solar powered thermochemical pipe based upon closed loop dry methane/carbon dioxide catalytic reforming reactions for heat storage and extraction. The process proposed by Fraenkel et al does not result in a net fuel output.

U.S. Pat. Nos. 3,766,027 and 3,852,180 teach methane production from water and carbon dioxide by use of electrical energy to drive water electrolysis producing a mixed gas product from which methane may be separated.

Use of coal, oil shale and tar sands gasification products including hydrogen/carbon monoxide mixtures in the electrochemical production of methane under high temperature laboratory conditions is taught by the Gur et al references, Gur, T. M. and Huggins, R. A., "Methane Synthesis on Nickel by a Solid-State Ionic Method", Science, 219, 967, Feb. 25, 1983; Huggins and Gur, U.S. Pat. No. 4,404,068; and Gur, T. M. and Huggins, R. A., "Electrolcatalysis of the Carbon Monoxide Methanation reaction on Stabilized Zirconia", Proc. of the Symp. on Electrocatalysis, Electrochem. Soc., Pennington, N.J., 1982.

A number of closed cycle reactant regenerative processes for splitting water are known, as taught by U.S. Pat. No. 4,332,650. A methane-methanol three step cycle for water splitting by: steam reforming methane; conversion of the products to methanol; and electrochemical reduction of methanol to methane and oxygen is taught by Biallas, B., Behr, F., Hunsanger, K., Kugler, B., Weirich, W., "The Methane-Methanol Hybrid Cycle", Hydrogen Energy Progress IV, Proceedings of the 4th World Hydrogen Energy Conference, California, USA, edited by T.N. Veziroglu, W. D. VanVorst, J. H. Kelly, 1982.

The prior art known to the applicants has not suggested a simple, two step, hybrid thermoelectrochemical cycle providing net production of gaseous fuel from water and carbon dioxide.

SUMMARY OF THE INVENTION

This invention provides a hybrid thermoelectrochemical two step process cycle for production of gaseous fuels from water and carbon dioxide. Some specific embodiments of the two step cycle of this invention provide a net output of methane instead of hydrogen or carbon monoxide.

The first step of the hybrid process cycle is a thermochemical step reforming methane by reacting with an oxidizer of water, carbon dioxide, and mixtures thereof producing carbon monoxide and hydrogen. The methane reforming step of this process cycle is a gas phase high temperature step rather than a liquid or solid decomposition reaction. The gas phase thermochemical step provides easy materials handling, catalyst recharge and reduced corrosion. The thermochemical methane reforming provides good thermodynamic properties, storing almost as much enthalpy but having about five to six times the gas phase entropy change as compared to water splitting. The methane reforming reaction, such as methane-steam reforming, is highly endothermic and can be carried out at temperatures of about 600° to 1000° C., preferably about 800° to 900° C. and at pressures of about 3 to about 100 atmospheres over a suitable methane reforming catalyst, such as a nickel based catalyst. Heat required for thermochemical step may be supplied by high temperature solar heat collectors, thermal energy from a high temperature nuclear reactor, or any other high temperature thermal energy source.

The second step of the hybrid process cycle is the electrochemical reduction of carbon monoxide which may be carried out using electrical energy supplied by a solar photovoltaic or nuclear driven generator. The carbon monoxide reduction reaction may be carried out in any suitable electrochemical cell, such as a solid state electrochemical cell as disclosed in U.S. Pat. No. 4,404,068. Electrochemical cell operation may be carried out at about ambient to about 650° C. producing gaseous fuel and oxygen for withdrawal from the cycle and methane for recycle to the methane reforming step. It is preferred that the electrochemical carbon monoxide reduction be performed at temperatures as near to ambient as possible since lower temperatures require less proportion of electrical energy input to the cycle. Preferred temperatures for the electrochemical step in the process cycle of this invention are about ambient to about 400° C. Thermal energy from the product of the thermal methane reforming step may be used to preheat the water or carbon dioxide input to the thermal methane reforming step.

The hybrid process cycles of this invention for production of methane are particularly advantageous since the thermal energy driven methane reforming step produces the stoichiometric amount of carbon monoxide and hydrogen used in the electrochemical reduction step and thus separation is not required within the cycle. The hybrid thermoelectrochemical cycles of this invention require a major portion of the energy input in the form of thermal energy which is more efficiently derived than electrical energy, providing an energy efficient closed cycle process.

The two step coupled reaction cycle of this invention results in a net output of gaseous fuel for withdrawal from the cycle and regeneration of methane for the methane reforming step with input to the cycle of only inorganic oxidizer water and/or carbon dioxide. In preferred embodiments the gaseous fuel withdrawn from the cycle comprises methane.

The two step coupled cycle of this invention allows a principal portion of the rquired energy to be more efficiently provided thermal as opposed to electrical energy.

It is an object of this invention to provide a two step process cycle for production of gaseous fuels from inorganic materials, namely water, carbon dioxide and mixtures thereof.

It is another object of this invention to provide a two step closed cycle process for production of gaseous fuels, predominately methane, from inorganic feeds.

It is yet another object of this invention to provide an energy efficient two step closed cycle process for production of gaseous fuels having only water and/or carbon dioxide input to the closed cycle.

It is still another object of this invention to couple in a process cycle having only an inorganic oxidizer chemical input a thermochemical methane reforming reaction with an electrochemical carbon monoxide reduction reaction which produces methane for recycle to the thermochemical methane reforming reaction with a net production of gaseous fuel for withdrawal from the cycle.

BRIEF DESCRIPTION OF THE DRAWING

Further objects and advantages of this invention will be apparent from the following more detailed description read in conjunction with the drawing wherein:

FIG. 1 is a highly schematic flow diagram of a two step hybrid thermochemical/electrochemical cycle for production of gaseous fuels from inorganic compounds according to this invention;

FIG. 2 is a schematic flow diagram of specific cycles Ia and Ib;

FIG. 3 is a schematic flow diagram of specific cycle Ic;

FIG. 4 is a schematic flow diagram of specific cycle IIa;

FIG. 5 is a schematic flow diagram of specific cycle IIb; and

FIG. 6 is a schematic flow diagram of specific cycles IIIa and IIIb.

DESCRIPTION OF THE PREFERRED EMBODIMENTS

FIG. 1 shows a generalized embodiment of the hybrid two step cycle of this invention wherein thermochemical methane reforming takes place by reacting methane with an inorganic oxidizer of water, carbon dioxide and mixtures thereof, in a high temperature reforming zone producing carbon monoxide and hydrogen. The thermochemical methane reforming is a gas phase reaction providing good thermodynamic properties for a thermochemical step, storing almost as much enthalpy but having 5 to 6 times the gas phase entropy change of water-splitting. In several specific cycle embodiments the stoichiometry of the methane reforming step provides the ratios of carbon monoxide and hydrogen needed for the electrochemical methane producing step. In other specific cycle embodiments, by combining steam and carbon dioxide in the thermochemical methane reforming, the reforming products of carbon monoxide and hydrogen can be produced in ratios needed in the electrochemical methane producing step. Methane is provided to the thermochemical methane reforming step from the electrochemical methane producing step. Water and carbon dioxide may be provided to the thermochemical methane reforming step from any suitable source. In a particularly advantageous embodiment, carbon dioxide may be scrubbed from the atmosphere or other source by a carbon dioxide absorber from which it is liberated by regeneration with heat. A number of carbon dioxide chemical absorption processes are known, such as those described in U.S. Pat. No. 3,766,027. The inorganic chemical oxidizer fed to the thermochemical methane reforming step may be advantageously preheated by thermal exchange with the product gas of the thermochemical methane reforming since it is desired that the electrochemical methane producing step be conducted at much lower temperatures. Since the desired carbon monoxide/hydrogen ratio is produced in the thermochemical methane reforming step, there is no necessity for gas separation in passing the reforming products to the electrochemical methane producing step.

The produced carbon monoxide is then electrochemically reduced in an electrochemical cell producing gaseous fuel and oxygen for withdrawal from the cycle and methane for recycle to the methane reforming zone. It is desired that the electrochemical carbon monoxide reduction be carried out at temperatures as close to ambient as is consistent with electrochemical reaction efficiency to provide low energy input to the cycle. Gaseous fuel, in excess to methane for recycle to the thermochemical methane reforming step, is produced in the electrochemical reduction step and separated from methane which is recycled.

It is seen that the process of this invention is a reactant regenerative closed cycle process except for the addition of inorganic oxidizer, water and/or carbon dioxide, to the cycle and withdrawal of fuel and oxygen from the cycle. It is to be recognized that the stoichiometric relations of the reaction cycles as set forth cannot be achieved in practice due to back reactions and other participating reactions. Therefore, in practice of specific cycles separations and make-up additions not shown may become necessary. Actual equilibria, process control, and thermal efficiencies must be considered in evaluation of specific cycles. The term "water" is used throughout this description and claims recognizing that under process conditions of temperature and pressure, liquid and/or steam may be present and thus the term "water" refers to both liquid and vapor phases. By the term "reactant regenerative closed cycle" is meant a process cycle which minimizes the addition or make-up of reactant chemicals other than water and carbon dioxide and minimizes reaction products to be removed other than desired gaseous fuel and gaseous oxygen.

Specific reaction coupled suitable for use in this invention together with their thermodynamic properties are set forth in Table I.

TABLE I

| | $\Delta G_{298K}$ (kcal/mole) | $\Delta S_{298K}$ (kcal/mole °K.) | E° (Volts) |
|---|---|---|---|
| Ia. $2CH_4 + 2H_2O(l) \rightarrow 2CO + 6H_2$ | 72.2 | .1598 | −.261 |
| $2CO + 6H_2 + CO_2 \rightarrow 3CH_4 + 2O_2$ | 123.3 | −.1012 | −.446 |
| $2H_2O(l) + CO_2 \rightarrow CH_4 + 2O_2$ | 195.5 | .0586 | −1.06 |
| Ib. $CH_4 + H_2O(l) \rightarrow CO + 3H_2$ | 36.1 | .0799 | −.261 |
| $CO + 3H_2 + H_2O(l) + CO_2 \rightarrow 2CH_4 + 2O_2$ | 159.4 | −.0213 | −1.15 |
| $2H_2O(l) + CO_2 \rightarrow CH_4 + 2O_2$ | 195.5 | .0586 | −1.06 |
| Ic. $CH_4 + H_2O(l) \rightarrow CO + 3H_2$ | 36.1 | .0799 | −.261 |
| $CO + 2H_2 \rightarrow CH_4 + \frac{1}{2}O_2$ | 20.6 | −.0406 | −.224 |
| $H_2O(l) \rightarrow H_2 + \frac{1}{2}O_2$ | 56.7 | .0393 | −1.23 |
| IIa. $CH_4 + CO_2 \rightarrow 2CO + 2H_2$ | 40.9 | 0.612 | −.443 |
| $2CO + 2H_2 + 2H_2O(l) \rightarrow 2CH_4 + 2O_2$ | 154.6 | −.00264 | −.838 |
| $2H_2O(l) + CO_2 \rightarrow CH_4 + 2O_2$ | 195.5 | .0586 | −1.06 |
| IIb. $CH_4 + CO_2 \rightarrow 2CO + 2H_2$ | 40.9 | 0.612 | −.443 |
| $CO + 2H_2 \rightarrow CH_4 + \frac{1}{2}O_2$ | 20.6 | −.0406 | −.224 |
| $CO_2 \rightarrow CO + \frac{1}{2}O_2$ | 61.5 | .0206 | −1.33 |
| IIIa. $3CH_4 + 2H_2O(l) + CO_2 \rightarrow 4CO + 8H_2$ | 113.1 | .221 | −.307 |
| $4CO + 8H_2 \rightarrow 4CH_4 + 2O_2$ | 82.48 | −.1624 | −.224 |
| $2H_2O(l) + CO_2 \rightarrow CH_4 + 2O_2$ | 195.6 | .0586 | −1.06 |
| IIIb. $2CH_4 + H_2O(l) + CO_2 \rightarrow 3CO + 5H_2$ | 77.0 | .1411 | −.334 |
| $3CO + 5H_2 + H_2O(l) \rightarrow 3CH_4 + 2O_2$ | 118.5 | −.0825 | −.514 |
| $2H_2O(l) + CO_2 \rightarrow CH_4 + 2O_2$ | 195.5 | .0586 | −1.06 |

Table I, groups seven hybrid cycles according to this invention by the nature of the thermochemical methane reforming step: Group I having the thermochemical reaction of methane with water; Group II having the thermochemical reaction of methane with carbon dioxide; and Group III having the thermochemical reaction of methane with both water and carbon dioxide. Table I shows the thermodynamic properties calculated for each of the cycles set forth with the assumption of room temperature operation of the electrochemical reduction step.

Cycles Ia and Ib for methane fuel production represent the same overall combined reaction stoichiometry and differ in Cycle Ib requiring addition of water to the electrochemical carbon monoxide reduction step as schematically shown in FIG. 2. Both two step cycles Ia and Ib result in net methane production for withdrawal from the cycle as a gaseous fuel with only the addition of water and carbon dioxide to the process cycle. The calculated thermal free energy contribution for Cycle Ia is 37 percent and for Cycle Ib is 23 percent.

Cycle Ic, shown schematically in FIG. 3, has the same reaction stoichiometry in the thermochemical methane reforming step as cycle Ib, but due to the lack of addition of water and carbon dioxide to the electrochemical step, net hydrogen is produced as gaseous fuel for withdrawal from the cycle with sufficient methane being formed only for recycle to the thermochemical methane reforming step. Cycle Ic has the overall reaction of water splitting in a coupled thermochemical methane reforming step and an electrochemical carbon monoxide reduction step with only water input to the cycle. The maximum thermal free energy contribution is 64 percent. This cycle would require a gas separation step in the recycle of methane to the thermochemical reforming step.

Cycle IIa, shown in FIG. 4, utilizes a cycle input of carbon dioxide in the thermochemical methane reforming step and an input of water to the electrochemical carbon monoxide reduction step to provide net methane fuel for withdrawal from the cycle with input of water and carbon dioxide. The thermal free energy contribution for this cycle is 21 percent. Cycle IIb, shown in FIG. 5, has the same thermochemical methane reforming step as cycle IIa but does not have the water input to the cycle in the carbon monoxide reduction step resulting in a net carbon monoxide gaseous fuel product for withdrawal from the cycle based upon only a carbon dioxide input to the cycle. The maximum thermal free energy contribution is 67 percent.

Process cycles IIIa and IIIb, shown in FIG. 6, both use cycle inputs of water and carbon dioxide to the thermochemical methane reforming step to result in a net methane gaseous fuel withdrawal from the cycle in the carbon monoxide electrochemical reduction step. Cycles IIIa and IIIb differ in the stoichiometry of the thermochemical methane reforming reaction and cycle IIIb additionally uses the addition of water to the carbon monoxide electrochemical reduction step. Thermochemical reforming in these cycles could be carried out in sequential steam and reforming steps or by combining these steps. Cycle IIIa has a thermal free energy contribution of 58 percent and Cycle IIIb 39 percent.

In the above net methane gaseous fuel production cycles, the reaction stoichiometry of the thermochemical methane reforming produced carbon monoxide and hydrogen matched to the reaction stoichiometry required for these materials in the electrochemical carbon monoxide reduction except for the addition of water and/or carbon dioxide. Cycle IIIa has the highest thermal energy contribution (58 percent) and the simplest electrochemical reaction.

The thermoelectrochemical hybrid cycle of this invention may provide higher solar conversion efficiencies than possible with other solar driven processes such as: direct photoelectrochemical where fuel is produced in the presence of sunlight and a photoactive material (photoelectrochemical); or generation of electricity in a photovoltaic panel and its use in operation of an electrolyzer where gaseous fuel is produced (photvoltaic/electrochemical). Photoelectrochemical water splitting and methane synthesis efficiency using solar energy has been calculated on theoretical based to be about 34 percent with less than 1 percent efficiencies having been obtained. Photovoltaic/electrochemical water splitting and methane synthesis efficiency using solar energy has been calculated on theoretical bases to be about 39 percent and 34 percent, respectively. Thermochemical-/electrochemical water splitting and methane synthesis efficiency using solar energy has been calculated on theoretical bases to be about 51 percent and 46 percent, respectively. Although actual obtainable efficiencies cannot be presently ascertained, the hybrid thermochemical methane reforming/electrochemical CO reduction two step reactant regenerative cycle of this invention provides potential efficiency advantages.

Thermochemical steam reforming of methane may be carried out at temperatures of about 600° to about 1000° C., preferably about 800° to about 900° C. Steam reforming of methane is a practiced commercial process. Suitable processes for the thermochemical methane reforming step of the hybrid thermoelectrochemical cycle of this invention may be selected from such commercial processes as those reviewed in James P. Van-Hook "Methane-Steam Reforming" Catal. Rev.-Sci. Eng., 21(a), pp 1–51 (1980).

Thermochemical carbon dioxide reforming of methane is not presently a commercial process but is an effective process with use of $Ni/SiO_2$ reforming catalyst at 970° C. as described by D. Fraenkel, R. Levitan and M. Levy, "A Solar Thermochemical Pipe Based on the $CO_2$—$CH_4$ (1:1) System". Int. J. Hydrogen Energy, Vol. 11, No. 4, pp. 267–277 (1986).

Carbon monoxide and hydrogen product of the methane reforming step is cooled by thermal transfer with cycle input water and/or carbon dioxide to reduce the overall thermal requirement of the cycle. Carbon monoxide and hydrogen is fed to the porous electrode of an electrochemical cell for electrochemical reduction of the carbon monoxide to form methane for recycle and gaseous fuel, preferably methane. Dependent upon the actual equilibria of the thermochemical methane reforming step, it may in some cases, be necessary to have a gas separation step to feed the appropriate ratios of carbon monoxide and hydrogen to the electrochemical cell. In view of the solubility characteristics of the chemical reactants, an appropriate electrolyte must be used, such as low temperature proton or oxide ion solid electrolytes, molten salt, or liquid electrolytes. Huggins et al, U.S. Pat. No. 4,404,068 teaches electrochemical carbon monoxide reduction to produce methane. Although the best presently known mode of electrochemical reduction of carbon monoxide to produce predominately, over about 75 volume percent, methane is at elevated temperatures of 250° to 650° C., lower temperatures close to ambient are desired for the hybrid cycle of this invention to reduce the proportion of electrical energy input to the cycle. Oxygen is discharged from the anode side of the electrochemical cell and may be used for any desired use. Products discharged from the cathode side of the cell comprise methane, water vapor, any unconverted hydrogen, and any unconverted carbon monoxide and carbon dioxide are passed to a separation zone for separation of methane to provide separated recycle methane and fuel methane. The fuel methane is withdrawn and the recycle methane is passed to the thermochemical methane reforming zone. Water vapor and other gases in the electrochemical cell output may be separated in any desired manner and recycled to the thermochemical reformer or the electrochemical cell as appropriate for the specific cycle being practiced.

The above separations may be carried out by any suitable technique as known to the art. Suitable reactors, thermal exchangers, and other system components will be apparent to one skilled in the art upon reading this disclosure.

In preferred embodiments, gaseous fuel comprising predominately methane is produced in a two step process having chemical input of only water and carbon dioxide and withdrawal of methane and oxygen. A thermochemical methane reforming reaction is carried out between methane and water or water and carbon dioxide to form stoichiometric ratios of carbon monoxide and hydrogen for electrochemical reduction of carbon monoxide to produce methane for recycle to the thermochemical methane reforming reaction and methane and oxygen for withdrawal from the cycle.

The two step hybrid process cycle of this invention by combining thermochemical methane reforming with electrochemical carbon monoxide reduction in a cyclic process results in chemically simple and energy efficient combinations of such reactions to produce a net output of gaseous fuels from water and carbon dioxide input to the cycle. Methane for reforming is formed in the process cycle. The hybrid process cycle for gaseous fuel production may advantageously use solar or nuclear energy primary sources. The two step hybrid thermoelectrochemical process provides greater use of more efficiently obtained thermal energy, thereby increasing overall process cycle energy efficiency, than prior processes for production of methane from water and carbon dioxide. The process may also reduce undesired carbon dioxide accumulation in addition to producing gaseous fuel from inorganic materials.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A two step hybrid process cycle for production of gaseous fuels from inorganic compounds comprising:
   thermochemically reforming methane in a thermochemical zone by reacting with an inorganic oxidizer selected from the group consisting of water, carbon dioxide, and mixtures thereof producing carbon monoxide and hydrogen;
   electrochemically reducing said carbon monoxide in an electrochemical zone producing oxygen, gaseous fuel selected from the group consisting of methane, hydrogen, carbon monoxide, and mixtures thereof, and methane for recycle;
   withdrawing said oxygen and said gaseous fuel from said cycle; and
   recycling said methane for recycle and adding said inorganic oxidizer to said thermochemical zone.

2. A two step hybrid process cycle according to claim 1 wherein said inorganic oxidizer comprises principally water and said gaseous fuel comprises principally methane.

3. A two step hybrid process cycle according to claim 1 wherein said thermochemical zone is maintained at temperatures of about 600° to about 1000° C.

4. A two step hybrid process cycle according to claim 3 wherein said temperatures are maintained by thermal energy from sources selected from the group consisting of nuclear reactor and solar.

5. A two step hybrid process cycle according to claim 1 wherein said thermochemical zone is maintained at temperatures of about 800° to about 900° C.

6. A two step hybrid process cycle according to claim 1 wherein said thermochemical zone is maintained at pressures of about 3 to about 100 atmospheres.

7. A two step hybrid process cycle according to claim 1 wherein said electrochemical zone is maintained at temperatures of about ambient to about 650° C.

8. A two step hybrid process cycle according to claim 1 wherein said inorganic oxidizer comprises principally carbon dioxide and said gaseous fuel comprises principally methane.

9. A two step hybrid process cycle according to claim 1 wherein said inorganic oxidizer comprises principally water and said gaseous fuel comprises principally hydrogen.

10. A two step hybrid process cycle according to claim 1 wherein said inorganic oxidizer comprises a mixture of wter and carbon dioxide and said gaseous fuel comprises principally methane.

11. A hybrid two step process for production of gaseous fuels from inorganic compounds, said process comprising:
  thermochemically reforming methane by reacting with a compound selected from the group consisting of water, carbon dioxide and mixtures thereof in a high temperature reforming zone to produce carbon monoxide and hydrogen;
  passing said produced carbon monoxide and hydrogen to an electrochemical reduction zone;
  electrochemically reducing said carbon monoxide in said electrochemical reduction zone producing oxygen, gaseous fuel selected from the group consisting of methane, hydrogen, carbon monoxide and mixtures thereof, and methane for recycle to said reforming zone;
  withdrawing said oxygen and gaseous fuel from said electrochemical reduction zone; and
  passing said methane for recycle to said reforming zone and adding to said reforming zone at least one of said inorganic compounds selected from the group consisting of water, carbon dioxide, and mixtures thereof.

12. A two step hybrid process cycle according to claim 11 wherein said inorganic oxidizer comprises principally water and said gaseous fuel comprises principally methane.

13. A two step hybrid process cycle according to claim 11 wherein said reforming zone is maintained at temperatures of about 600° to about 1000° C.

14. A two step hybrid process cycle according to claim 13 wherein said temperatures are maintained by thermal energy from sources selected from the group consisting of nuclear reactor and solar.

15. A two step hybrid process cycle according to claim 11 wherein said reforming zone is maintained at temperatures of about 800° to about 900° C.

16. A two step hybrid process cycle according to claim 11 wherein said reforming zone is maintained at pressures of about 3 to about 100 atmospheres.

17. A two step hybrid process cycle according to claim 11 wherein said electrochemical reduction zone is maintained at temperatures of about ambient to about 650° C.

18. A two step hybrid process cycle according to claim 11 wherein said inorganic oxidizer comprises principally carbon dioxide and said gaseous fuel comprises principally methane.

19. A two step hybrid process cycle according to claim 11 wherein said inorganic oxidizer comprises principally water and said gaseous fuel comprises principally hydrogen.

20. A two step hybrid process cycle according to claim 11 wherein said inorganic oxidizer comprises a mixture of water and carbon dioxide and said gaseous fuel comprises principally methane.

21. A two step hybrid process cycle according to claim 11 wherein said inorganic compound added to said reforming zone is preheated by thermal exchange with said carbon monoxide and hydrogen product of said reforming zone.

* * * * *